United States Patent
Wang et al.

(10) Patent No.: US 7,210,988 B2
(45) Date of Patent: May 1, 2007

(54) METHOD AND APPARATUS FOR REDUCED WEAR POLISHING PAD CONDITIONING

(75) Inventors: Yan Wang, Sunnyvale, CA (US); Stan D. Tsai, Fremont, CA (US); Yongqi Hu, San Jose, CA (US); Feng Q. Liu, San Jose, CA (US); Liang-Yuh Chen, Foster City, CA (US); Daxin Mao, Cupertino, CA (US); Huyen Karen Tran, San Jose, CA (US); Martin S. Wohlert, San Jose, CA (US); Renhe Jia, Berkeley, CA (US); Yuan A. Tian, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/209,167

(22) Filed: Aug. 22, 2005

(65) Prior Publication Data
US 2006/0046623 A1 Mar. 2, 2006

Related U.S. Application Data

(60) Provisional application No. 60/604,209, filed on Aug. 24, 2004, provisional application No. 60/686,364, filed on Jun. 1, 2005.

(51) Int. Cl.
*B24B 53/00* (2006.01)
(52) U.S. Cl. .................. 451/56; 451/443; 451/456
(58) Field of Classification Search ............ 451/443, 451/444, 56, 72, 41, 456
See application file for complete search history.

(56) References Cited

U.S. PATENT DOCUMENTS 4,169,337 A    10/1979  Payne (Continued)

FOREIGN PATENT DOCUMENTS

EP    0620293    10/1994

(Continued)

OTHER PUBLICATIONS

Brusic, V., et al., "Copper Corrosion With and Without Inhibitors", Electochem. Soc., 138:8, 2253-2259, Aug. 1991.

(Continued)

*Primary Examiner*—Robert A. Rose
(74) *Attorney, Agent, or Firm*—Patterson and Sheridan (57) ABSTRACT

Embodiments of a conditioning head for in-situ conditioning and/or cleaning a processing pad of a CMP, ECMP, or other processing system are provided. In one embodiment, the conditioning head includes a brush disposed in a central cavity. A cleaning fluid is provided through the central cavity of the conditioning head to a processing pad. The brush spins and moves laterally across the surface of the processing pad. The cleaning solution dispensed through the conditioning head dissolves by-products of the processing operation while the brush gently wipes the processing pad. A lip of the conditioning head retains the cleaning fluid and cleaning waste, thereby minimizing contamination of the area outside of the conditioning head. The cleaning waste is removed from the processing pad via passages formed near the outer periphery of the conditioning head.

35 Claims, 6 Drawing Sheets

U.S. PATENT DOCUMENTS

| | | | |
|---|---|---|---|
| 4,588,421 | A | 5/1986 | Payne |
| 4,752,628 | A | 6/1988 | Payne |
| 4,867,757 | A | 9/1989 | Payne |
| 5,081,051 | A | 1/1992 | Mattingly et al. |
| 5,264,010 | A | 11/1993 | Brancaleoni et al. |
| 5,384,986 | A | 1/1995 | Hirose et al. |
| 5,614,444 | A | 3/1997 | Farkas et al. |
| 5,643,067 | A | 7/1997 | Katsuoka et al. |
| 5,662,769 | A | 9/1997 | Schonauer et al. |
| 5,700,383 | A | 12/1997 | Feller et al. |
| 5,738,574 | A | 4/1998 | Tolles et al. |
| 5,738,800 | A | 4/1998 | Hosali et al. |
| 5,756,398 | A | 5/1998 | Wang et al. |
| 5,769,689 | A | 6/1998 | Cossaboon et al. |
| 5,785,585 | A | 7/1998 | Manfredi et al. |
| 5,835,137 | A | 11/1998 | McKeown |
| 5,840,629 | A | 11/1998 | Carpio |
| 5,876,508 | A | 3/1999 | Wu et al. |
| 5,885,137 | A * | 3/1999 | Ploessl ............... 451/56 |
| 5,911,835 | A | 6/1999 | Lee et al. |
| 5,932,486 | A | 8/1999 | Cook et al. |
| 5,938,507 | A | 8/1999 | Ko et al. |
| 5,958,794 | A | 9/1999 | Bruxvoort et al. |
| 5,981,454 | A | 11/1999 | Small |
| 6,033,993 | A | 3/2000 | Love, Jr. et al. |
| 6,042,741 | A | 3/2000 | Hosali et al. |
| 6,046,110 | A | 4/2000 | Hirabayashi et al. |
| 6,054,379 | A | 4/2000 | Yau et al. |
| 6,063,306 | A | 5/2000 | Kaufman et al. |
| 6,068,879 | A | 5/2000 | Pasch |
| 6,074,949 | A | 6/2000 | Schonauer et al. |
| 6,077,337 | A | 6/2000 | Lee |
| 6,083,840 | A | 7/2000 | Mravic et al. |
| 6,096,652 | A | 8/2000 | Watts et al. |
| 6,117,775 | A | 9/2000 | Kondo et al. |
| 6,117,783 | A | 9/2000 | Small et al. |
| 6,123,088 | A | 9/2000 | Ho |
| 6,135,868 | A * | 10/2000 | Brown et al. ............... 451/443 |
| 6,156,661 | A | 12/2000 | Small |
| 6,162,301 | A | 12/2000 | Zhang et al. |
| 6,165,956 | A | 12/2000 | Zhang et al. |
| 6,190,236 | B1 | 2/2001 | Drill |
| 6,190,243 | B1 | 2/2001 | Wada et al. |
| 6,244,935 | B1 | 6/2001 | Birang et al. |
| 6,273,797 | B1 | 8/2001 | Becker et al. |
| 6,274,059 | B1 | 8/2001 | Krusell et al. |
| 6,331,136 | B1 * | 12/2001 | Bass et al. ............... 451/56 |
| 6,348,725 | B2 | 2/2002 | Cheung et al. |
| 6,355,075 | B1 | 3/2002 | Ina et al. |
| 6,355,153 | B1 | 3/2002 | Uzoh et al. |
| 6,432,826 | B1 | 8/2002 | Emani et al. |
| 6,436,302 | B1 | 8/2002 | Li et al. |
| 6,451,697 | B1 | 9/2002 | Sun et al. |
| 6,508,697 | B1 * | 1/2003 | Benner et al. ............... 451/443 |
| 6,524,167 | B1 | 2/2003 | Tsai et al. |
| 6,541,697 | B1 | 4/2003 | Georg et al. |
| 6,569,349 | B1 | 5/2003 | Wang et al. |
| 6,572,446 | B1 | 6/2003 | Osterheld et al. |
| 6,572,466 | B1 | 6/2003 | Del Ser Gonzalez |
| 6,593,239 | B2 | 7/2003 | Kaufman et al. |
| 6,593,282 | B1 | 7/2003 | Li et al. |
| 6,653,242 | B1 | 11/2003 | Sun et al. |
| 6,656,842 | B2 | 12/2003 | Li et al. |
| 6,709,314 | B2 | 3/2004 | Kaushal et al. |
| 6,709,316 | B1 | 3/2004 | Sun et al. |
| 6,736,952 | B2 | 5/2004 | Emesh et al. |
| 6,846,227 | B2 | 1/2005 | Sato et al. |
| 6,899,592 | B1 | 5/2005 | Kojima et al. |
| 2001/0004538 | A1 | 6/2001 | Li et al. |
| 2001/0052351 | A1 | 12/2001 | Brown |
| 2002/0148169 | A1 | 10/2002 | Emani et al. |
| 2003/0114004 | A1 | 6/2003 | Sato et al. |
| 2004/0023602 | A1 | 2/2004 | Maloney et al. |

FOREIGN PATENT DOCUMENTS

| | | | |
|---|---|---|---|
| EP | 0859407 | 8/1998 | |
| EP | 0913442 | 5/1999 | |
| FR | 2722511 | 1/1996 | |
| JP | 59-134650 | * 8/1984 | ............... 451/65 |
| WO | WO 93/10277 | 5/1993 | |
| WO | WO 98/49723 | 11/1998 | |
| WO | WO 99/46353 | 9/1999 | |
| WO | WO 00/30159 | 5/2000 | |
| WO | WO 00/36037 | 6/2000 | |
| WO | WO 00/49647 | 8/2000 | |
| WO | WO 00/53691 | 9/2000 | |
| WO | WO 00/59029 | 10/2000 | |

OTHER PUBLICATIONS

U.S. Appl. No. 09/469,709, filed Dec. 21, 1999.

* cited by examiner

METHOD AND APPARATUS FOR REDUCED WEAR POLISHING PAD CONDITIONING

CROSS-REFERENCE TO RELATED APPLICATIONS

This application claims the benefit of U.S. Provisional Patent Application Ser. No. 60/604,209, filed on Aug. 24, 2004, and U.S. Provisional Patent Application Ser. No. 60/686,364, filed on Jun. 1, 2005, both of which are incorporated by reference herein in their entireties.

BACKGROUND OF THE INVENTION

1. Field of the Invention

Embodiments of the invention generally relate to a method and apparatus for conditioning a polishing pad.

2. Description of the Related Art

Electrochemical Mechanical Processing (ECMP) is a technique used to remove conductive materials from a substrate surface by electrochemical dissolution while concurrently polishing the substrate with reduced mechanical abrasion as compared to conventional Chemical Mechanical Polishing (CMP) processes. ECMP systems may generally be adapted for deposition of conductive material on the substrate by reversing the polarity of the bias applied between the substrate and an electrode. Electrochemical dissolution is performed by applying a bias between a cathode and a substrate surface to remove conductive materials from the substrate surface into a surrounding electrolyte. The bias may be applied to the substrate surface by a conductive contact disposed on or through a polishing material upon which the substrate is processed. The polishing material may be, for example, a processing pad disposed on a platen. A mechanical component of the polishing process is performed by providing relative motion between the substrate and the polishing material that enhances the removal of the conductive material from the substrate.

The processing pad is an important aspect of the ECMP process. The processing pad must have the appropriate mechanical properties for substrate planarization while minimizing the generation of defects in the substrate during polishing. Such defects may be scratches in the substrate surface caused by raised areas of the pad or by polishing by-products disposed on the surface of the pad, such as abraded portions of the pad, agglomerations of abrasive particles from a polishing slurry, removed materials from the substrate, and the like. The processing pad generally deteriorates naturally during polishing due to wear and/or accumulation of polishing by-products on the pad surface. Thus, the pad surface must periodically be refreshed, or conditioned, to restore the performance of the pad. Conventionally, a diamond conditioning disk is used to work the top layer of the pad surface into a state that possesses desirable polishing results. However, conventional conditioning processes that aggressively interact with the pad may have an adverse affect on the pad lifetime. Additionally, aggressive conditioning processes may cause parts of the conditioning element to come free and be left on the pad after conditioning, which may lead to scratches and defect generation on the substrate surface. Some processing pads withstand aggressive conditioning relatively well. Other processing pads are much more sensitive to conditioning by abrasion due to their low thickness, fragility and/or material of composition. Aggressive conditioning of these pads may result in pad damage and/or may severely reduce the pad lifetime, adding to lost service time for pad replacement and increased cost of production.

Another factor affecting the usable life of processing pads is copper by-product contamination. During ECMP of copper layers, copper by-products will precipitate out of the electrolyte solution. This copper precipitate will then contaminate the polishing pad as well as other areas of the polishing tool, i.e., the polishing head, the platen, the conditioning head, and the like. This precipitate does not dissolve in de-ionized water (DI water) and makes operation, rinsing and maintenance of the polishing pad and tool difficult.

Therefore, there is a need for an improved method for conditioning processing pads.

SUMMARY OF THE INVENTION

Embodiments of a conditioning head for in-situ conditioning and/or cleaning a processing pad of a CMP, ECMP, or other processing system are provided. In one embodiment, the conditioning head includes a brush disposed in a central cavity. A cleaning fluid is provided through the central cavity of the conditioning head to a processing pad. The brush spins and moves laterally across the surface of the processing pad. The cleaning solution dispensed through the conditioning head dissolves by-products of the processing operation while the brush gently wipes the processing pad. The cleaning waste is removed from the processing pad via vacuum passages formed near the outer periphery of the conditioning head. A lip of the conditioning head retains the cleaning fluid and cleaning waste, thereby minimizing contamination of the area outside of the conditioning head.

In another embodiment, the conditioning head includes a transducer for energizing the surface of the processing pad. The vibrations produced by the transducer loosens and/or dislodges matter disposed on the processing pad and allows for their removal via a vacuum supplied to waste removal passages formed near the periphery of the conditioning head. The transducer may be used alone or in combination with a cleaning fluid or brush.

In another embodiment, a method for conditioning a pad includes the steps of pressing a conditioning element against a conductive pad with a force in the range of about 0.01 to about 2 pounds and providing a conditioning fluid to the pad in a manner that substantially prevents mixing with processing fluid disposed on the pad. Embodiments of the inventive method may be utilized with either an abrasive conditioner or a brush conditioner. Further embodiments of the inventive process either may be used alone or in combination with a cleaning fluid.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

A method and apparatus for conditioning a processing pad is provided herein. The method and apparatus conditions the processing pad with less wear to the pad surface as compared to prior art pad conditioners. The cleaning methods described herein utilize a chemical cleaning and/or ultrasonic method to clean the pad surface of polishing by-products substantially without physically removing pad materials. This increases pad lifetime while maintaining processing performance consistency. It is contemplated that the teachings disclosed herein may be used to condition polishing and processing pads in CMP, ECMP, and other polishing systems.

Apparatus

Figure 1:
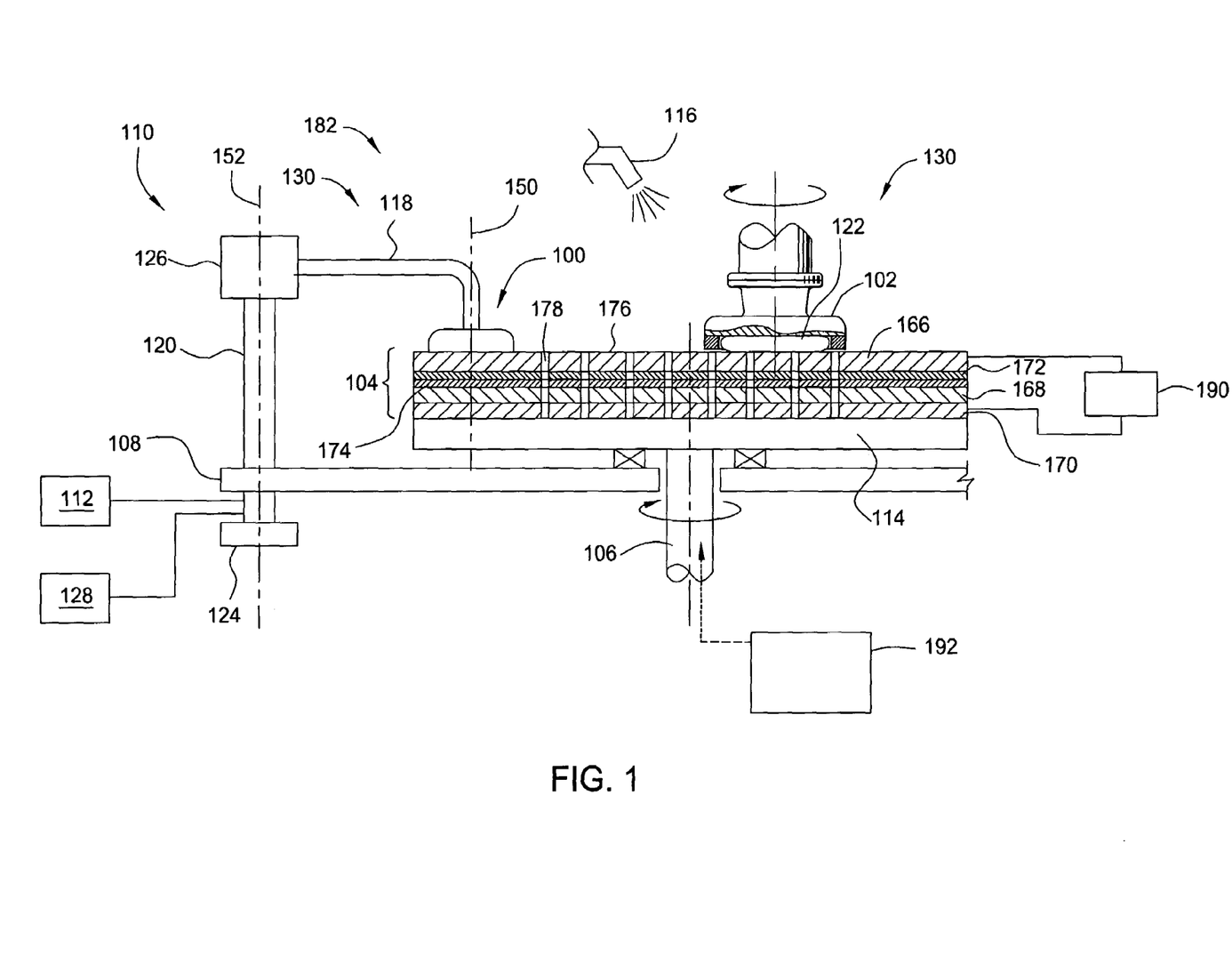
FIG. 1 is a simplified side view of an ECMP polishing station having a conditioning head of the present invention.

FIG. 1 is a simplified side view of a polishing station 130 of an ECMP system having a conditioning head 100 of the present invention. An example of ECMP stations that may be adapted to benefit from aspects of the invention are described in U.S. Pat. Ser. No. 6,244,935 issued Jun. 12, 2001, to Birang et al. and U.S. Provisional Patent Application Ser. No. 60/484,189 filed Jul. 1, 2003 by Wang, et al., both of which are incorporated herein by reference in their entireties. The polishing station 130 generally includes a platen 114 supported by a shaft 106 disposed on or through a base 108. The platen 114 may be rotated by a motor (not shown). A polishing pad 104 is disposed on the upper surface of the platen 114. Examples of polishing and other processing pads suitable for use in an ECMP system are described in U.S. patent application Ser. No. 10/455,895, filed Jun. 30, 2003, and U.S. patent application Ser. No. 10/642,128, filed Aug. 15, 2003, each of which are hereby incorporated by reference in their entireties.

In one embodiment, the polishing pad 104 may include a conductive layer 166. An electrode 170 may be coupled to the conductive layer 166 to form as a unitary replaceable pad stack. The conductive layer 166 has an exposed processing surface 176 on which the substrate 122 is processed. The electrode 170 is disposed on the platen 114 and is coupled to a first terminal of a power source 190. A second terminal of power source 190 is coupled to the conductive layer 166.

The conductive layer 166 may be fabricated from a conductive material, a conductive composite, or one or more exposed conductive elements as part of the processing surface 176. For example, conductive material may be dispersed integrally with or comprise the material comprising the processing surface 176, such as a polymer matrix having conductive particles dispersed therein and/or a conductive coated fabric, among others. The conductive particles may be tin, nickel and/or carbon, among others. It is contemplated that the conductive layer 166 may include one or more non-conductive regions comprising a portion of the processing surface 176, such as regions of polyurethane.

The pad 104 may include one or more intervening layers. For example, a conductive foil 172 may be disposed below the conductive pad 166 to promote uniform power distribution across the conductive pad 166. An interposed pad 174 may be provided below the foil 172 in increase mechanical attributes of the conductive layer 166. A subpad 168 may be provided to tailor the compliance of the pad 104. It is contemplated that other pad assemblies will also benefit from the invention.

A carrier head 102 is disposed above the platen 114 and is adapted to hold a substrate against the polishing pad 104 during processing. The carrier head 102 may impart a portion of the relative motion provided between the substrate and the polishing pad 104 during processing. In one embodiment, the carrier head 102 may be a TITAN HEAD™ or TITAN PROFILER™ wafer carrier available from Applied Materials, Inc., of Santa Clara, Calif. A processing fluid, such as an abrasive slurry and/or an electrolyte, may be provided to the surface of the polishing pad 104 by, for example, a nozzle 116 coupled to a processing fluid source (not shown). Alternatively, the polishing fluid may be provided through the platen 114 and polishing pad 104.

The conditioning head 100 is supported by a support assembly 110 coupled to the base 108. Support assembly 110 is adapted to position the conditioning head 100 in contact with the polishing pad 104 and further is adapted to provide a relative motion therebetween. The conditioning head 100 generally rotates and/or moves laterally across the surface of the polishing pad 104 as indicated by arrows 310 and 312 in FIG. 3. In one embodiment, the lateral motion of the conditioning head 100 may be linear or along an arc in a range of about the center of the polishing pad 104 to about the outer edge of the polishing pad 104, such that, in combination with the rotation of the polishing pad 104, the entire surface of the polishing pad 104 may be conditioned. The conditioning head 100 may have a further range of motion to move the conditioning head 100 beyond the edge of the polishing pad 104, e.g., when not in use (as shown in phantom in FIG. 3). One example of a support assembly that may be modified to use with the conditioning head 100 is described in U.S. Pat. Ser. No. 6,702,651, issued Mar. 9, 2004, to Tolles, et al., which is hereby incorporated by reference.

In one embodiment, the support assembly 110 includes a stanchion 120 coupled to the base 108 and a support arm 118 coupled to the stanchion 120. The support arm 118 cantilevers the conditioning head 100 over the polishing pad 104. A motor 126 may be utilized to rotate the conditioning head 100 about an axis 150 and an actuator 124 may selectively raise and lower the conditioning head 100 relative to the polishing pad 104. Another actuator 122 may be used to rotate the support arm 118, and hence, the conditioning head 100, relative to an axis 152. The actuator 122 may be used to move the conditioning head 100 to the side of the polishing pad 104 when not in use and also may hold in one position or oscillate the conditioning head 100 on the polishing pad 104 during pad cleaning operations.

A cleaning fluid source 112 is coupled to the conditioning head 100 through the support assembly 110 to provide a cleaning fluid to the conditioning head 100. A vacuum supply 128 is also coupled to the conditioning head 100 through the support assembly 110 to remove cleaning waste from the conditioning head 100.

Figure 2:
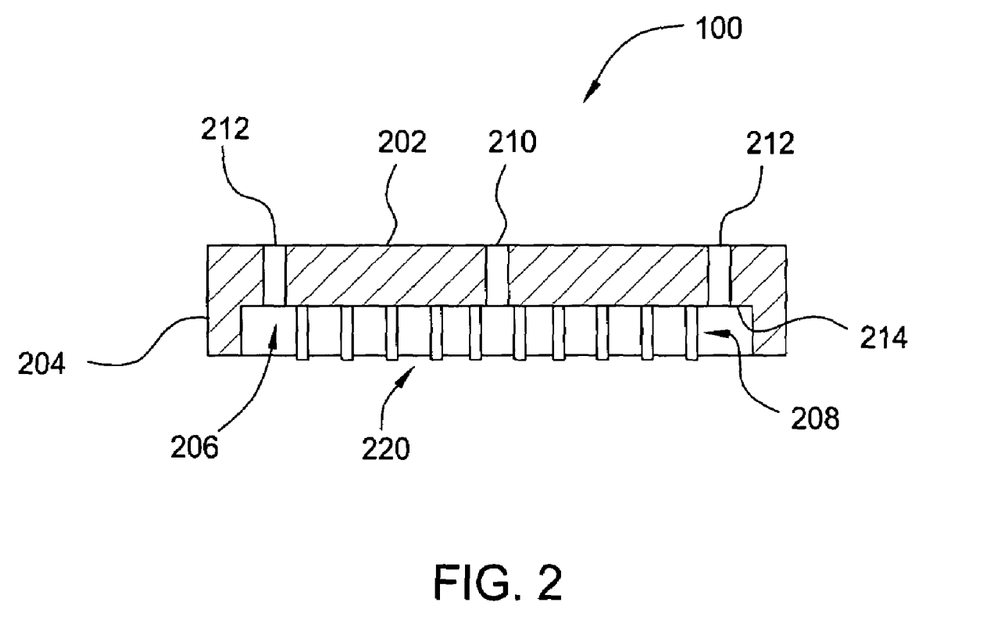
FIG. 2 is a cross-sectional side view of the conditioning head having one embodiment of a conditioning element of the present invention.

FIG. 2 is a cross-sectional side view of the conditioning head 100. In one embodiment, conditioning head 100 generally includes a body 202 which has a flange or lip 204 extending downwardly from a perimeter of the body 202 to define a cavity 206 therein. A conditioning element 220 is coupled to the bottom surface 214 of the cavity 206. In the embodiment depicted in FIG. 2, the conditioning element 220 is in the form of a brush 208. A passage 210 is formed in the body 202 of the conditioning head 100 and is coupled to the cleaning fluid supply 112 (shown in FIG. 1) to provide the cleaning fluid to the cavity 206. At least one passage 212, shown in FIG. 2 as two passages 212, is located proximate the outer perimeter of the cavity 206 and connected to the vacuum supply 128 (shown in FIG. 1) for removing cleaning waste from the cavity 206.

The lip 204 of the conditioning head 100 may be made of polyphenylene sulfide (PPS), polyethylene terephthalate (PET), rubber and other plastic polymer materials that will not damage the surface of the polishing pad 104 and are inert to the polishing and cleaning fluids. Additional suitable materials for the lip 204 include smooth metals which are inert to the processing chemicals in use, such as stainless steel, noble metals, and the like. The body 202 of the conditioning head 100 may be made of any compatible material and may be part of a unitary construction with the lip 204 or a separate construction attached to the lip 204.

The brush 208 generally extends beyond the lip 204 of the conditioning head 100 by about 0.2 to about 1 mm. In one embodiment, the brush 208 extends 0.5 mm beyond the lip 204. The exact length of the brush 208 may vary depending on the hardness of the materials used to form the brush 208 and the depth of the cavity 206, and in one embodiment, is about 1 to about 15 mm long. The brush 208 can be made of nylon, cotton cloth, polymer, or other soft material that will not damage the surface of the polishing pad 104. Alternatively, the brush 208 may be made of a textured polymer or stainless steel element having a roughened surface, such as by sand-blasting.

Optionally, a compressible pad 216 may be interposed between the brush 208 and the bottom surface 214 of the conditioning head 100 such that the brush 208 applies a lesser force against the polishing pad when in use. The pad 216 may be a porous pad to allow the cleaning solution to flow from the passage 210 into the cavity 206 through the pad 216. Alternatively or in combination, an aperture may be formed in the pad 216 and aligned with the passage 210 to facilitate flow therethrough. The pad 216 may be formed from a foamed polymer, such as a foamed polyurethane or other suitable material. It is contemplated that the pad 216 may be utilized in any of the embodiments of the conditioning head disclosed herein.

Figure 4:
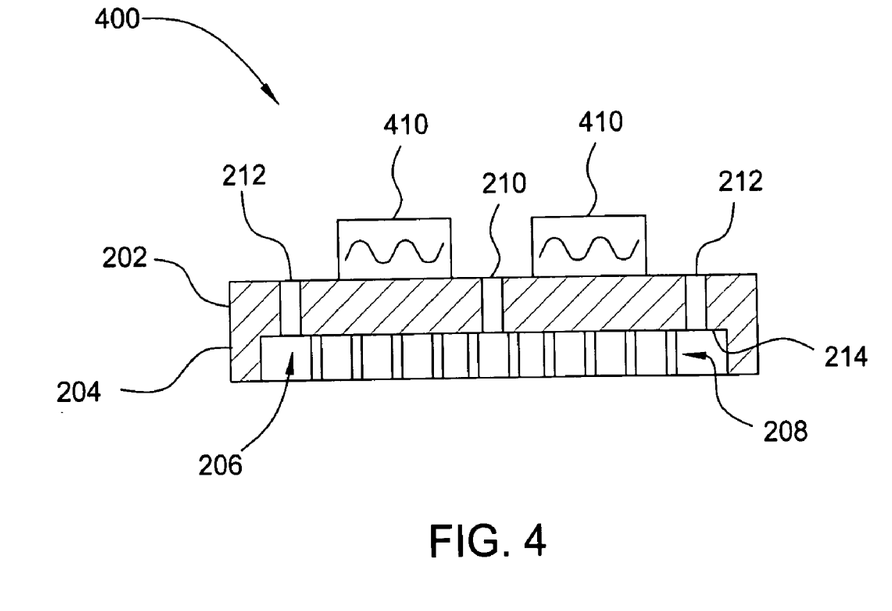
FIG. 4 is a cross-sectional side view of another embodiment of the conditioning head of the present invention.

FIG. 4 is a cross-sectional side view of another embodiment of the conditioning head 400. Conditioning head 400 is substantially similar to the conditioning head 100 described with respect to FIGS. 1 and 2 with the addition of a transducer 410 integrated into the conditioning head 400. The transducer 410 utilizes sonic waves to excite the surface of the polishing pad 104 and thereby enhance removal of polishing or processing by-products from the polishing pad 104. The transducer 410 generally operates at a frequency in the range of about 500 Hz to about 2 MHz and with a power in the range of about 10 mW to about 100 mW. The exact frequency, power, and duration of use of the transducer 410 will depend upon the conditioning requirements of the underlying processing pad and brush configuration. The transducer 410 can be used with or without the cleaning fluid and/or brush 208 as described above with respect to conditioning head 100.

The conditioning head 100 may be used to clean the polishing pad 104 during and/or after a polishing process. In one mode of operation, the polishing pad 104 may be cleaned in-situ while polishing a substrate. For example, a substrate disposed in the carrier head 102 may be pressed against the polishing pad 104 disposed on the platen 114 and relative motion provided therebetween by rotating one or both of the platen 114 and the carrier head 102. A polishing fluid from a polishing source (not shown) is disposed on the surface of the polishing pad 104 via nozzle 116.

Figure 3:
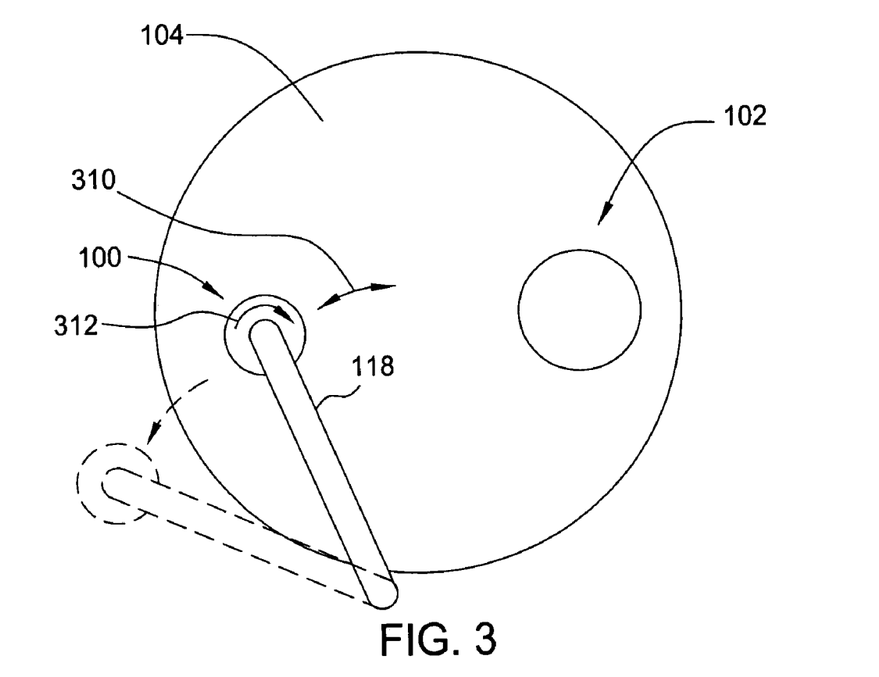
FIG. 3 is a plan view of a platen showing the relative movements of the polishing and conditioning heads.

The conditioning head 100 spins and sweeps the pad surface during the substrate polishing to perform in-situ pad cleaning as shown by arrows 310, 312 in FIG. 3. The support assembly 110 moves the conditioning head 100 into position over the surface of the polishing pad 104. The support assembly 110 then lowers the conditioning head 100 and presses the lip 204 and the brush 208 of the conditioning head 100 against the surface of the polishing pad 104 with a down-force in the range of about 0.01 to about 5 pounds (lbs). In another embodiment, the down-force may be in the range of about 0.2 to about 1 lbs. As the lip 204 of the conditioning head 100 is lightly contacted against the polishing pad 104, the lip 204 provides a barrier or seal that contains most of the cleaning fluid within the cavity 206 of the conditioning head 100. Thus, the probability of contamination of the polishing fluid by the cleaning fluid during polishing is minimized. The barrier provided by the lip 204 also serves to keep out most of the polishing fluid from passing under the conditioning head 100, thereby preventing polishing fluid from being sucked into the waste removal passages 212.

In another embodiment, the lip 204 may be positioned slightly above the processing pad to prevent abrasion between the lip 204 and the pad and/or control the force applied by the brush 208 against the surface of the pad. The proximity of the lip 204 to the pad 104 provides the aforementioned barrier feature that prevents fluid intermixing. This may be accomplished by, for example, a mechanical stop (not shown) that prevents lowering the conditioning head beyond a predetermined position above the processing pad. This may be desirable in operations where cross-contamination of the cleaning and processing fluids is not an issue, or where less processing fluid is present on the pad, such as in conventional CMP processes. This configuration may also be utilized with a sonic transducer integrated into the conditioning head 100, as discussed below with respect to the embodiment depicted in FIG. 4.

The cleaning fluid supply 112 provides the cleaning fluid to the cavity 206 of the conditioning head 100 through passage 210. The cleaning fluid disperses through the soft brush 208 and onto the surface of the polishing pad 104. In one embodiment, the cleaning fluid is generally supplied at a rate of about 10 ml/min to about 500 ml/min.

The conditioning head 100 may be rotated at a speed of about 5 to about 120 rpm. The rotational motion helps disperse the cleaning fluid throughout the brush 208 and cavity 206, rotates the brush 208, and moves the cleaning waste to the outer periphery of the cavity 206 where it can be efficiently removed through the waste removal passages 212.

The support assembly 110 may also move the rotating conditioning head 100 laterally along the surface of the polishing pad 104 to ensure that the conditioning head 100 cleans and conditions the entire surface of the polishing pad 104. The lateral movement of the conditioning head 100 is not generally limited, so long as the movement of the conditioning head 100 does not interfere with the movement of the carrier head 102. A radial movement covering edge to center of the polishing pad 104 will ensure complete coverage of the polishing pad 104, however the conditioning is only necessary over the region of the pad contacted by the substrate and/or carrier head 102. In one embodiment, the lateral movement, or sweep, of the carrier head 102 is in the range of about 0 to about 14 inches from pad center and has a frequency of motion of about 5 to about 40 cycles/minute. In another embodiment, the sweep of the carrier head 102 is in the range of about 3.6 to about 11.5 inches. It is contemplated that other speeds, downforces, ranges of motion, etc. may be utilized to optimize cleaning or conditioning performance of various polishing or processing pads in various processing systems.

Figure 5:
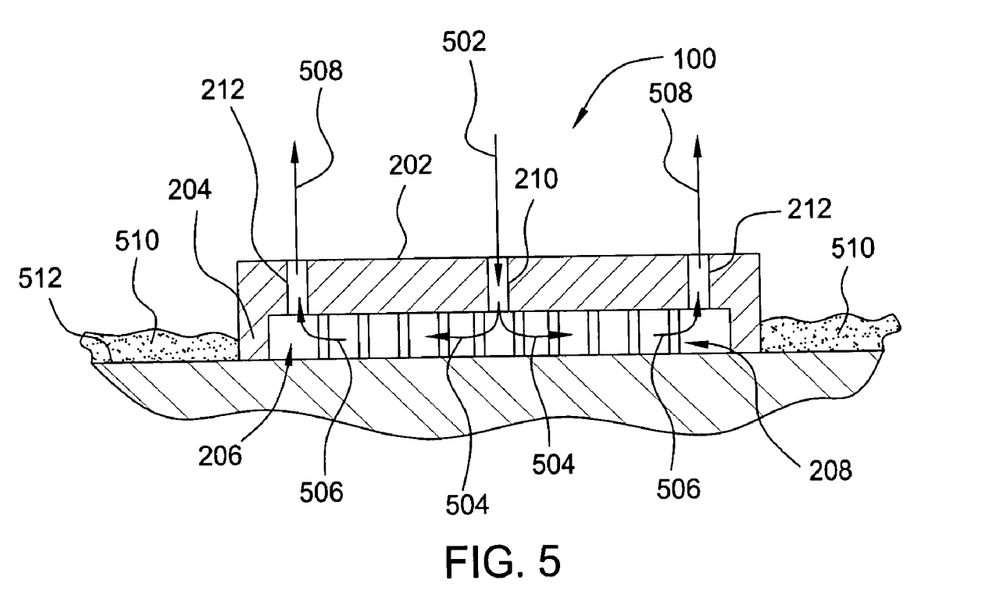
FIG. 5 is a partial, sectional side view of a conditioning head and processing pad illustrating operation of the conditioning head.

One example of a method of in-situ cleaning of a polishing pad is described below with respect to FIG. 5. FIG. 5 depicts a conditioning head 100, as described above with respect to FIG. 2, in contact with an upper surface 512 of a polishing pad. A processing fluid 510, for example an electrolyte during an ECMP process, is disposed on the upper surface 512. The lip 204 of the conditioning head presses against the upper surface 512 of the polishing pad, substantially isolating the processing fluid 510 from the central cavity 206 of the conditioning head 100. A cleaning fluid is introduced into the cavity 206 through a passage 210 formed proximate the center of the conditioning head 100, as indicated by arrow 502. The cleaning fluid then propagates through the brush 208 to the upper surface 512 of the polishing pad and outward towards the lip 206, as indicated by arrows 504. The cleaning fluid reaching the outer periphery of the cavity 206 is then removed from the cavity 206 via passages 212, as depicted by arrows 506 and 508. As described above, the relative motion between the conditioning head 100 and the upper surface 512 of the processing pad allows the brush 208 to gently wipe the upper surface 512 of the processing pad. The relative motion may be provided by rotation of the processing pad and/or conditioning head 100, lateral movement of the processing pad and/or conditioning head 100, or any combination thereof.

Figure 6:
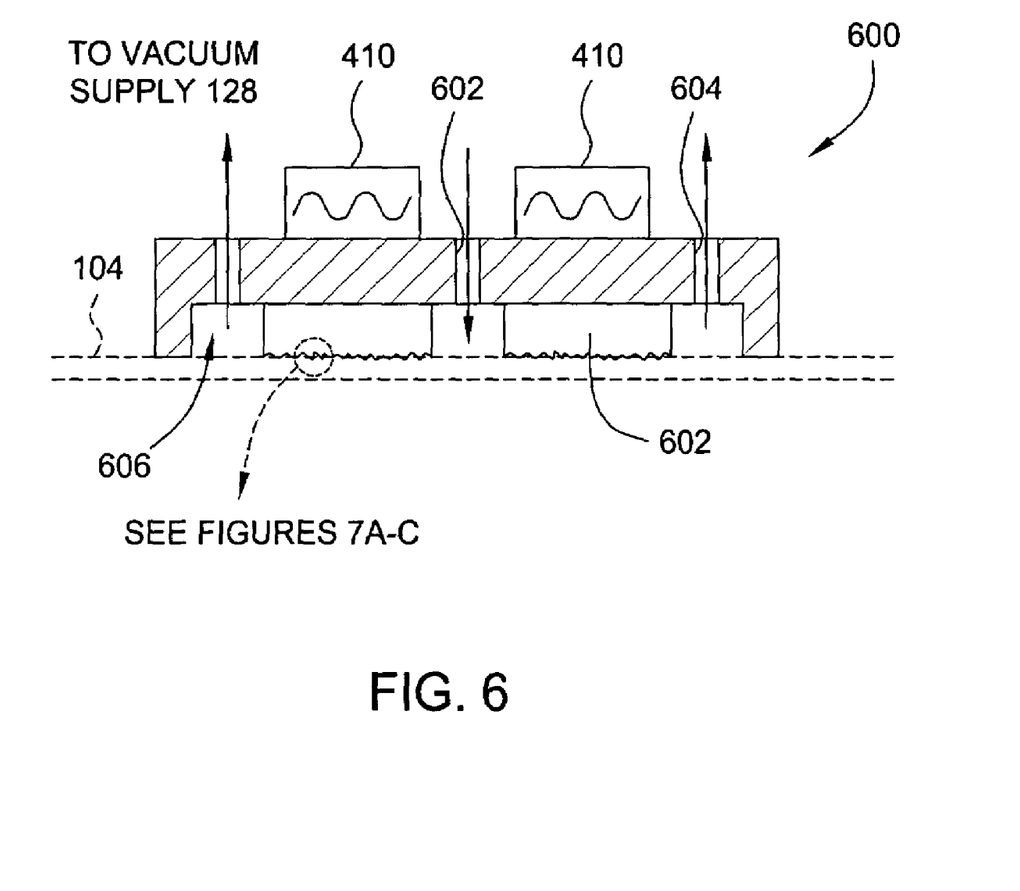
FIG. 6 is a cross-sectional side view of the conditioning head of FIG. 2 having another embodiment of a conditioning element coupled thereto.

FIG. 6 is a cross-sectional side view of a conditioning head 600 having another embodiment of a conditioning element 620 disposed in a cavity 606 of the head. The conditioning element 620 is a replaceable abrasive disk. In one example, the abrasive disk includes a plurality of diamond abrasive elements utilized to condition the pad 104 (shown in phantom). In the embodiment depicted in FIG. 6, the conditioning head 600 includes at least a first aperture 602 for providing cleaning fluid to the pad 216 and one or more second apertures 604 for allowing cleaning waste to be removed from the pad 104 and/or the cavity 606 by the vacuum supply 128. Generally, the first aperture 602 is located radially inward of the second aperture 604 to take advantage of the centrifugal force generated during conditioning to move the cleaning fluid between the apertures 602, 604 during conditioning.

One example of a conditioning element that may be adapted to benefit from the invention is described in U.S. patent application Ser. No. 10/411,752, filed on Apr. 10, 2003, which is hereby incorporated by reference herein in its entirety. Another example of a conditioning element that may be adapted to benefit from the invention is described in U.S. patent application Ser. No. 11/142,918, filed on Jun. 6, 2005, which is hereby incorporated by reference herein in its entirety, and includes a conditioning element having a plurality of diamond particles disposed on its face.

Figure 7A:
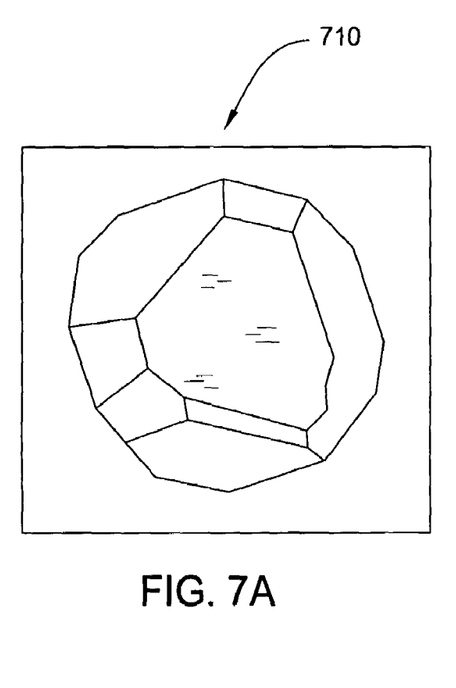
FIGS. 7A–C are plan views of embodiments of diamond particles that may be utilized in a condition element.
Figure 7B:
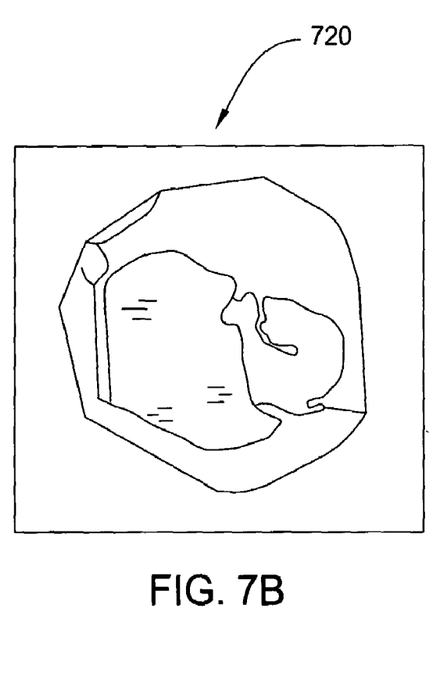
Figure 7C:
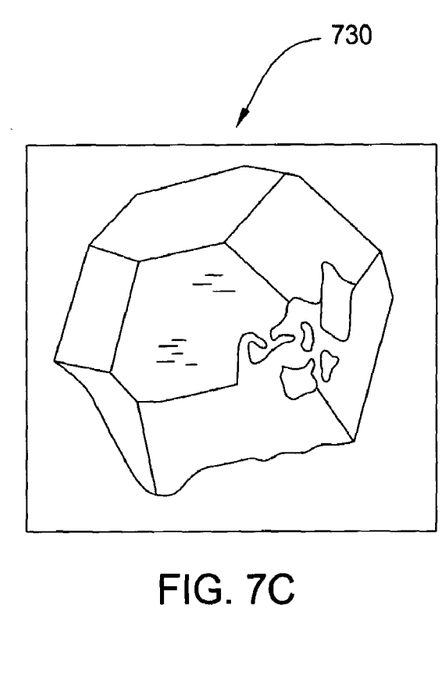

For example, as depicted in FIG. 7, the conditioning element 620 may include a plurality of diamond particles of a type selected from the group of very blocky (4D) 710, blocky (3D) 720, and irregular (2D) 730, and have a shape ratio less than or equal to 1.2. In one embodiment, the diamond particles have an average size of between about 85 and about 115 µm. In one embodiment, the size of the diamond particles may have a standard of deviation that is less than about 5 µm. In one embodiment, the diamond particles may have a spacing of greater than 400 µm.

The conditioning element 620 may be utilized as described in any of the embodiments above to treat the surface of the pad 104. For example, the conditioning element 600 may be contacted to the pad 104 with a down-force in the range of about 0.01 to about 2 lbs, such as between about 1.0 lbs and about 2 lbs, for example, about 1.5 lbs. In one embodiment, no cleaning liquids are supplied during an in-situ pad conditioning process, however, an electrolyte for polishing is provided to maintain a liquid film or wet condition between conditioning head and pad surface. Electrolyte may be supplied at a rate of about 10 ml/min to about 500 ml/min. The conditioning element 620 may be rotated at a speed of about 30 to about 60 rpm, for example, about 37 rpm. The conditioning element 620 may be swept across the pad 104 over a range between about 0.1 and 14 inches, for example, between about 2.6 inches and about 11.5 inches. The frequency of the sweep may be in the range of about 2 to about 40 cycles/minute, such as between about 5 and about 13 cycles/minute, for example 11 cycles/minute and may be selected to match carrier head frequency of sweep. This process has demonstrated a reduction of defects when polishing tungsten dots formed on the substrate.

It is contemplated that the conditioning element 620 may also be utilized with a sonic transducer, such as the transducer 410 described above. The conditioning element 620 may also be utilized in the presence or absence of a cleaning fluid. Conditioning element 600 may also be utilized in the presence or absence of a vacuum for removing cleaning waste from the conditioning head 100.

Cleaning Fluid Composition

The cleaning fluid is formulated to dissolve polishing by-product and is generally used to clean the pad. In one aspect of the invention, for cleaning processing pads utilized for copper polishing, the cleaning fluid may be amine solutions, carboxylic acid solutions and their combination with amines, and the like. The pH value can be adjusted to be similar to that of the main processing fluid so that it does not affect the polishing performance in the event that cleaning fluid 150 is mixed in with the polishing fluid.

In another aspect of the invention, a cleaning fluid suitable for cleaning and/or conditioning a polishing pad 104 during copper electrochemical mechanical processing is described below. The cleaning fluid dissolves the copper precipitate, thus assisting in refurbishing the processing tool and restoring polishing performance. The cleaning fluid can be an acid, basic, or neutral water solution. The cleaning fluid may also be a combination of acids and bases as described herein. The pH of the cleaning solution may be adjusted by the addition of organic or inorganic acids to a range of about 5 to about 11.

For an acid-based cleaning fluid, the acid may be inorganic or organic. Suitable inorganic acids include phosphoric, sulfuric, and nitric acids having a concentration in the range of about 0.1 to about 2 percent. Suitable organic acids include acetic, citric, adipic, lactic, and malic acids having a concentration in the range of about 0.1 to about 5 percent.

For a base-based cleaning fluid, the base may also be inorganic or organic. Suitable inorganic bases include ammonium hydroxide and potassium hydroxide having a concentration in the range of about 0.1 to about 2 percent. Suitable organic bases include ethylenediamine (EDA), diethylenetriamine (DETA), and ethylenediamine tetraacetic acid (EDTA) having a concentration in the range of about 0.1 to about 5 percent.

The cleaning fluid may also include organic acid salts. Suitable organic salts include ammonium citrate, ammonium tartarate, ammonium succinate, or their potassium derivatives having a concentration in the range of about 0.1 to about 10 percent. The cleaning fluid may also include one or more inorganic or organic acids. Suitable inorganic or organic acids include acetic acid, phosphoric acid, citric acid, and oxalic acid, either alone or in combination, having a total concentration in the range of about 0.1 to about 7 percent.

In one embodiment, the composition of a cleaning fluid includes an acetic acid-based system having from about 0.5 to about 5 percent EDA and a pH in the range of about 5 to about 11. In another embodiment, the above composition has a concentration of EDA in the range of about 1 to about 3 percent. In yet another embodiment, the concentration of EDA is about 2 percent. Another embodiment of the above cleaning fluid composition has a pH in the range of about 7 to about 10. Yet another embodiment has a pH in the range of about 9 to about 10. The pH of the system may be adjusted by controlling the amount of acetic acid in the system.

In another embodiment, the composition of a cleaning fluid includes a citric acid-based system having from about 0.5 to about 5 percent EDA and a pH in the range of about 5 to about 11. In another embodiment, the above composition has a concentration of EDA in the range of about 1 to about 3 percent. In yet another embodiment, the concentration of EDA is about 2 percent. Another embodiment of the above cleaning fluid composition has a pH in the range of about 7 to about 10. Yet another embodiment has a pH in the range of about 9 to about 10. The pH of the system may be adjusted by controlling the amount of citric acid in the system.

Other compatible components may be added to the cleaning fluid to protect the copper surface of the polished substrate, such as a corrosion inhibitor. Examples of suitable corrosion inhibitors include benzotriazole (BTA), mercaptobenzotriazole, or 5-methyl-1-benzotriazole (TTA). The corrosion inhibitor may have a total concentration of about 0.1 percent to about 0.3 percent. For example, from about 0.1 to about 0.3 percent BTA may be added to 0.5 percent EDA in a solution having a pH in the range of about 5 to about 7 for acetic acid or citric acid.

Although this cleaning fluid is described as being applied via the conditioning head 100, it is contemplated that other methods of application may be equally utilized for cleaning copper precipitate in processing systems. For example, the cleaning fluid may be sprayed onto the polishing pad and other components of the processing system then subsequently rinsed using a high-pressure DI water rinsing spray. Alternatively, the cleaning solution may be fed through passages in the polishing pad to the surface of the pad.

While the foregoing is directed to the illustrative embodiment of the present invention, other and further embodiments of the invention may be devised without departing from the basic scope thereof.

The invention claimed is:

1. An apparatus for cleaning a processing pad, comprising:
    a main body rotatable on its central axis and having a downwardly opening cavity;
    a conditioning element centrally disposed in the cavity and extending downwardly therefrom;
    a cleaning fluid supply port formed in the body in communication with the cavity; and
    a first waste removal port formed in the body in communication with the cavity adjacent an outer perimeter of the cavity.

2. The apparatus of claim 1 further comprising a lip circumscribing the cavity.

3. The apparatus of claim 2, wherein the body and the lip are of a unitary construction.

4. The apparatus of claim 2, wherein the lip is fabricated from one or more of polyphenylene sulfide, polyethylene terephthalate, rubber, stainless steel or noble metals.

5. The apparatus of claim 1, wherein the conditioning element is a brush.

6. The apparatus of claim 5, wherein the brush extends between about 0.2 and about 15 mm from a lower edge of the body.

7. The apparatus of claim 5, wherein the brush extends about 0.5 mm from a lower edge of a lip circumscribing the cavity.

8. The apparatus of claim 5, wherein the brush comprises at least one of nylon, cotton cloth, or polymer.

9. The apparatus of claim 5, wherein the brush comprises has a roughened element.

10. The apparatus of claim 9, wherein the roughened element comprises stainless steel.

11. The apparatus of claim 1, further comprising an elastic pad disposed between the conditioning element and the body.

12. The apparatus of claim 1, further comprising a sonic transducer coupled to the body.

13. The apparatus of claim 12, wherein the sonic transducer is capable of producing a sonic signal in the range of about 500 Hz to about 2 MHz.

14. The apparatus of claim 12, wherein the sonic transducer is capable of producing a sonic signal at a power in the range of about 10 to about 100 mW.

15. The apparatus of claim 1, wherein the conditioning element is a diamond disk.

16. An apparatus for cleaning a processing pad, comprising:
    a head rotatable on its central axis and having a lower outer edge configured to substantially prevent mixing of fluids disposed underneath and outside the head;
    a replaceable conditioning element coupled to the head and having at least one aperture;
    a vacuum port formed in the head and disposed proximate the lower outer edge of the head;
    a fluid supply port formed in the head inward of the vacuum port;
    a vacuum generator coupled to the vacuum port; and
    a fluid source coupled to the head and adapted to provide a fluid through the aperture.

17. A method for conditioning a processing pad, comprising:
    pressing a conditioning element coupled to a conditioning head against an upper surface of a processing pad;
    providing a cleaning fluid to the upper surface of the processing pad through a hole in the conditioning element;
    providing relative motion between the conditioning head and the upper surface of the processing pad, wherein the conditioning head rotates about its central axis;
    flowing conditioning fluid outwardly from the hole to an edge of the conditioning element; and
    removing conditioning waste and conditioning fluid flowing out from under the edge of the conditioning element through the conditioning head.

18. The method of claim 17, wherein the step of providing relative motion between the conditioning element and the upper surface of the processing pad further comprises:
rotating the conditioning element between about 30 to about 60 revolutions per minute; and
sweeping the conditioning element across the pad at a rate of about 5 to about 13 cycles/minute.

19. The method of claim 17, wherein the step of contacting the conditioning element to the upper surface of the processing pad further comprises:
pressing a brush against the processing pad with a force between about 0.1 to about 2 pounds.

20. The method of claim 17, wherein the step of contacting the conditioning element to the upper surface of the processing pad further comprises:
pressing a diamond disk against the processing pad with a force between about 0.1 to about 2 pounds.

21. The method of claim 18, wherein the step of contacting the conditioning element to the upper surface of the processing pad further comprises:
pressing a brush against the processing pad with a force between about 0.01 to about 5 pounds.

22. A method for conditioning a processing pad, comprising:
pressing a conditioning element coupled to a conditioning head against an upper surface of a processing pad;
providing a cleaning fluid containing an acid to the upper surface of the processing pad through the conditioning element;
providing relative motion between the conditioning head and the upper surface of the processing pad, wherein the conditioning head rotates about its central axis; and
removing conditioning waste through the conditioning head.

23. The method of claim 22, wherein the step of providing the acid further comprises:
flowing at least one acid to the processing pad selected from the group consisting of phosphoric acid, sulfuric acid, nitric acid, acetic acid, citric acid, adipic acid, lactic acid, and malic acid.

24. A method for conditioning a processing pad, comprising:
pressing a conditioning element coupled to a conditioning head against an upper surface of a processing pad;
providing a cleaning fluid containing a base to the upper surface of the processing pad through the conditioning element;
providing relative motion between the conditioning head and the upper surface of the processing pad, wherein the conditioning head rotates about its central axis; and
removing conditioning waste through the conditioning head.

25. The method of claim 24, wherein the step of providing the base further comprises:
flowing at least one base to the processing pad selected from the group consisting of ammonium hydroxide, potassium hydroxide, ethylenediamine (EDA), diethylenetriamine (D ETA), and ethylenediamine tetraacetic acid (EDTA).

26. A method for conditioning a processing pad, comprising:
pressing a conditioning element coupled to a conditioning head against an upper surface of a processing pad;
providing a cleaning fluid containing a salt to the upper surface of the processing pad through the conditioning element;
providing relative motion between the conditioning head and the upper surface of the processing pad, wherein the conditioning head rotates about its central axis; and
removing conditioning waste through the conditioning head.

27. The method of claim 26, wherein the step of providing the salt further comprises:
flowing at least one salt to the processing pad selected from the group consisting of ammonium citrate, ammonium tartarate, ammonium succinate, and their potassium derivatives.

28. A method for conditioning a processing pad, comprising:
pressing a conditioning element coupled to a conditioning head against an upper surface of a processing pad;
providing a cleaning fluid containing acetic acid and about 0.5 to about 5 percent EDA to the upper surface of the processing pad through the conditioning element;
providing relative motion between the conditioning head and the upper surface of the processing pad, wherein the conditioning head rotates about its central axis; and
removing conditioning waste through the conditioning head.

29. A method for conditioning a processing pad, comprising:
pressing a conditioning element coupled to a conditioning head against an upper surface of a processing pad;
providing a cleaning fluid containing citric acid and about 0.5 to about 5 percent EDA to the upper surface of the processing pad through the conditioning element;
providing relative motion between the conditioning head and the upper surface of the processing pad, wherein the conditioning head rotates about its central axis; and
removing conditioning waste through the conditioning head.

30. The method of claim 17 further comprising:
sonically exciting the polishing pad.

31. The method of claim 30, wherein the step of exciting the polishing pad further comprises:
exciting the polishing pad with an energy wave having a frequency between about 500Hz to about 2MHz.

32. The method of claim 17 further comprising:
processing a substrate on the upper surface while the conditioning element is in contact with the pad.

33. A method for in-situ conditioning a conductive polishing pad, comprising:
pressing a conditioning head against a conductive upper surface of a polishing pad having a processing fluid disposed thereon, wherein pressing the head comprises a contact pressure of between about 0.1 lbs and about 2 lbs;
providing a conditioning fluid to the conductive polishing pad in a manner that substantially isolates the conditioning fluid;
providing relative motion between the conditioning head and the conductive polishing pad, wherein the conditioning head rotates about its central axis; and
flowing conditioning fluid between the polishing pad and the conditioning element in a center to edge flowpath.

34. The method of claim 33 further comprising:
removing at least a portion of the conditioning fluid through the conditioning head.

35. The method of claim 33, wherein, the conditioning head is moved between about 2.6 inches and about 11.5 inches across the surface of the conductive polishing pad at about 5 to about 13 cycles per minute.

* * * * *